United States Patent [19]

Okumura

[11] Patent Number: 4,628,382

[45] Date of Patent: Dec. 9, 1986

[54] CASSETTE LOADING DEVICE FOR VTR

[75] Inventor: Yuuzi Okumura, Osaka, Japan

[73] Assignee: Sanyo Electric Co., Ltd., Osaka, Japan

[21] Appl. No.: 760,794

[22] Filed: Jul. 31, 1985

[30] Foreign Application Priority Data

Dec. 20, 1984 [JP] Japan ................. 59-269847

[51] Int. Cl.⁴ ............................................. G11B 15/00
[52] U.S. Cl. ...................... 360/93; 360/96.5; 242/198
[58] Field of Search ............... 360/93, 96.1, 96.5, 360/71; 242/198–199

[56] References Cited

U.S. PATENT DOCUMENTS 4,099,213 7/1978 Schatterman .............. 360/96.5 X
4,320,424 3/1982 Murayama ................. 360/71 X
4,379,313 4/1983 Tsuchiya ..................... 360/96.5

FOREIGN PATENT DOCUMENTS

59-221863 12/1984 Japan .

*Primary Examiner*—John H. Wolff
*Attorney, Agent, or Firm*—Armstrong, Nikaido, Marmelstein & Kubovcik

[57] ABSTRACT

A cassette loading device for VTR's wherein a reduction drive assembly for coupling a cassette holder to a drive source comprises a first drive mechanism having a small reduction ratio and a second drive mechanism having a great reduction ratio. The cassette holder is driven by the first drive mechanism when transporting a cassette and by the second drive mechanism when completing the loading of the cassette.

7 Claims, 11 Drawing Figures

CASSETTE LOADING DEVICE FOR VTR

BACKGROUND OF THE INVENTION

The present invention relates to a cassette loading device for cassette-type video tape recorders (hereinafter referred to as "VTR") by which a tape cassette inserted into the main body of the VTR is transported to the specified loaded position for reproduction and recording.

Generally used as cassette loading devices in recent years are those of the so-called front loading type by which the cassette is inserted into a casette holder in the interior of the main body of VTR through a cassette inlet which is open at the front side of the VTR main body. The present invention relates to improvements in such front loading type.

Figure 11:
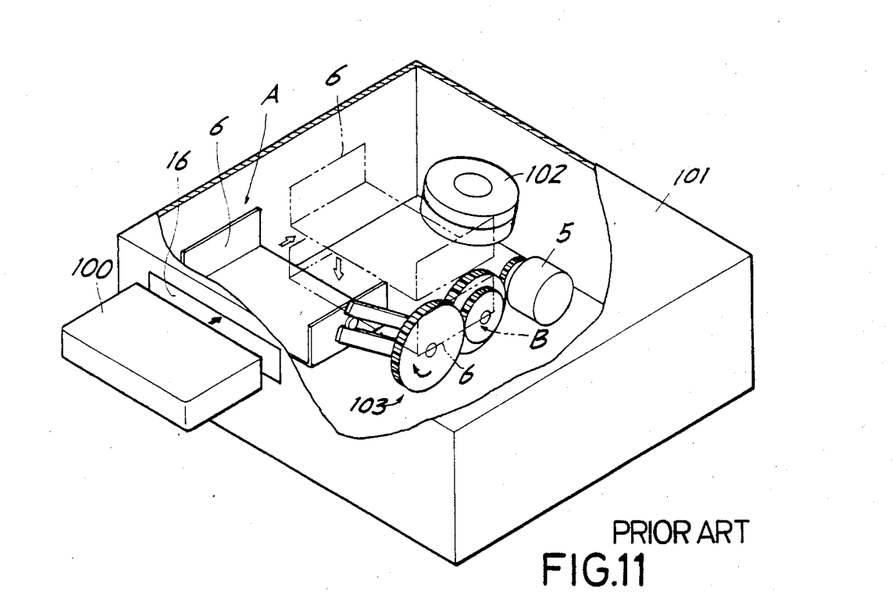
FIG. 11 is a perspective view partly broken away of a VTR to show a conventional cassette loading device.

With reference to FIG. 11 showing a cassette loading device of the front loading type, a cassette 100 is inserted through a cassette inlet 16 at the front side of the main body 101 of a VTR into a cassette holder 6 at an insertion standby position A within the VTR main body. By means of a drive source, i.e. a drive motor 5, and a gear assembly or like power transmission mechanism 103 coupled to the motor, the cassette is transported along with the cassette holder 6 to a loaded position B horizontally and vertically as indicated by the arrows. When the cassette 100 is set in this position, the tape is withdrawn and wound around a VTR cylinder 102 by a tape loading mechanism (not shown) for recording or reproduction.

Such a cassette loading device of the front loading type is disclosed in detail, for example, in Published Unexamined Japanese Patent Application SHO No. 58-164049.

With the cassette loading device described above, the cassette is being placed into the cassette holder 6 at the insertion standby position A and pushed inwardly of the device manually. The command for initiating the drive source into operation is then given on the way to go in by turning on a switch provided in the VTR main body.

The drive force delivered from the drive motor 5 through the power transmission mechanism 103 is utilized for holding the cassette 100 in the loaded position B stably. The power transmission mechanism includes, for example, a cam mechanism (not shown) which is coupled to the drive motor. When the cassette holder approaches the loaded position, the cam face of the cam mechanism moves with the rotation of the drive motor, whereby the cassette holder 6 pushed inwardly of the device is pressed down against the chassis of the VTR main body 101 by a cam follower. In this state, the drive motor is de-energized. When the cassette is completely loaded in position, the cam follower is positioned at the top of the cam face, where the follower is dynamically in balance with the cam. Consequently, even if the drive motor is de-energized, the cassette holder 6 is held pressed down, so that the holder, i.e. the cassette 100 can be restrained in place on the chassis without backlash.

To restrain the cassette holder with an increased force when the cassette is completely loaded in place, there is a need to increase the load on the cam mechanism to increase the pressure of the cam face on the cam follower. However, this requires a greater power for driving the cam face, and for this purpose, the power transmission mechanism is conventionally set to a higher reduction ratio.

Accordingly, the conventional cassette loading device has the problem that owing to the increase in the reduction ratio, a greater pressure is required for reversely driving the power transmission mechanism from the output side, i.e. from the cassette holder side, when the cassette holder is pushed in until the drive motor is automatically brought into operation.

SUMMARY OF THE INVENTION

An object of the present invention is to provide a cassette loading device with which the cassette can be lightly and smoothly pushed into the VTR through its cassette inlet and in which a cassette holder is held pressed down against a frame when the cassette is completely loaded in position.

Another object of the present invention is to provide a device of the type described wherein the cassette holder is movable from a cassette insertion position to the completely loaded position by a first drive mechanism of a small reduction ratio, the cassette holder being adapted to be coupled to a second drive mechanism of a great reduction ratio at or immediately before the completely loaded position so as to be pressed down against the frame.

Still another object of the present invention is to provide a device of the type described which comprises two drive mechanisms provided by a single drive gear and a drive shaft and in which a large gear portion of the drive gear meshes with a small gear portion of the drive shaft to drive the drive shaft at a small reduction ratio when transporting the cassette, and a roller projecting from one side surface of the drive gear engages with a lever projecting from the drive shaft to drive the drive shaft at a great reduction ratio when pressing the cassette down, the change of reduction ratio thus being effected without using any change-over means.

DETAILED DESCRIPTION OF THE INVENTION

Figure 1:
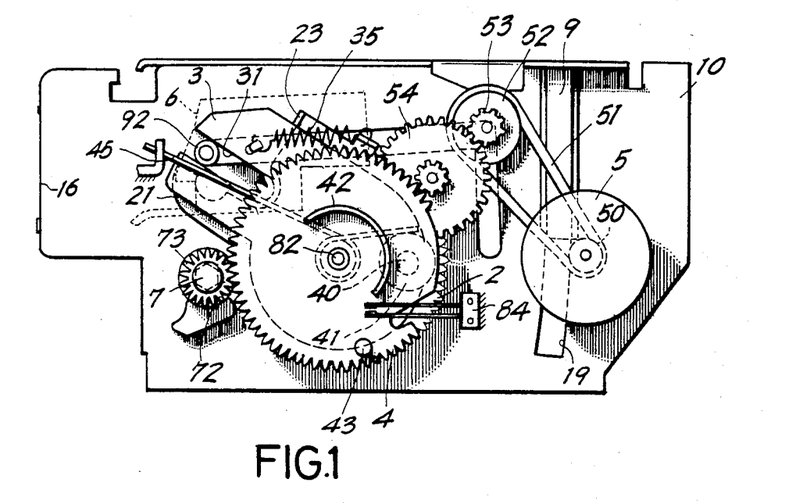
FIG. 1 is a right side elevation of a cassette loading device of the present invention.
Figure 2:
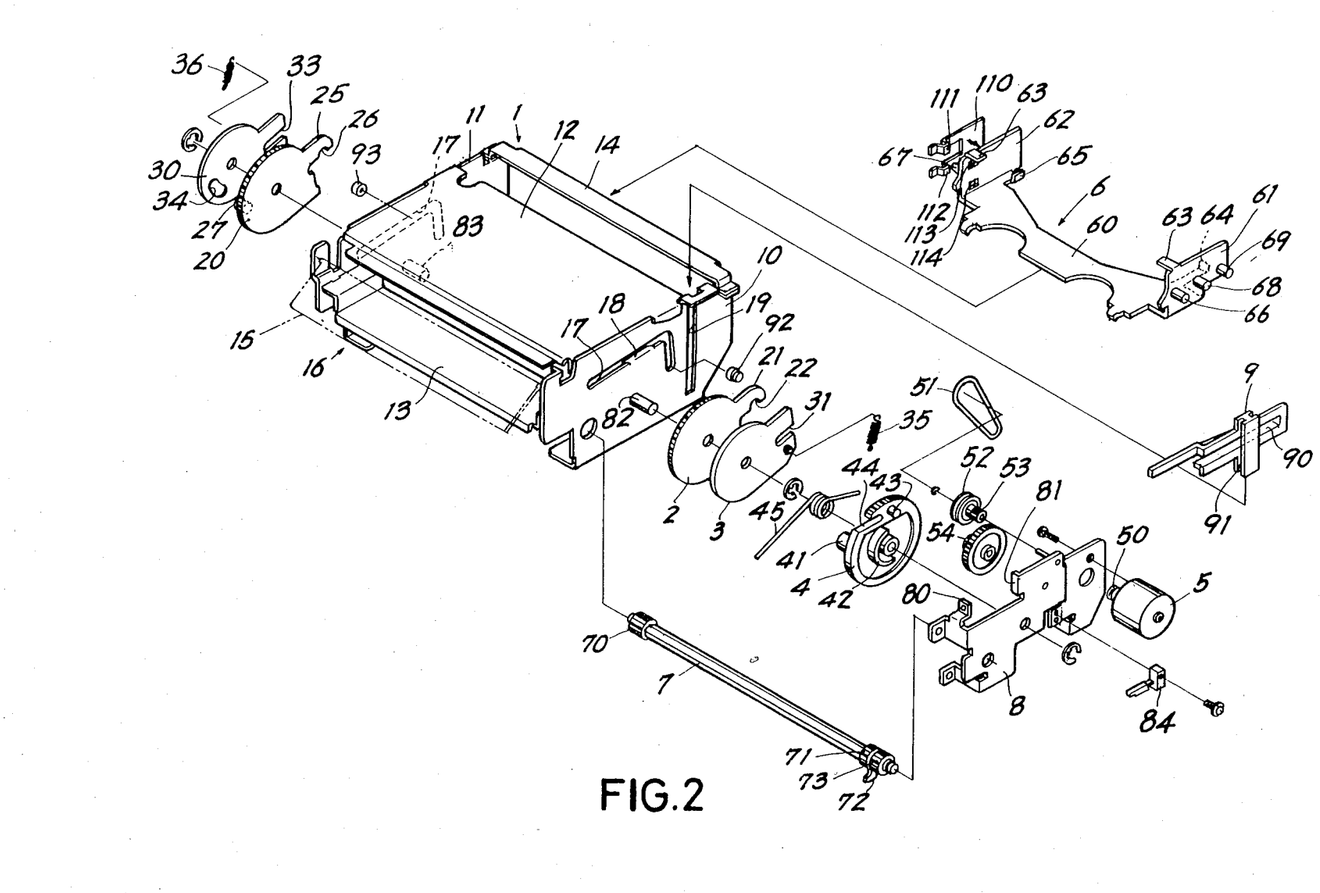
FIG. 2 is an exploded perspective view of the cassette loading device.

FIGS. 1 and 2 show a cassette loading device embodying the present invention.

A frame 1 which is open at its front and rear comprises a pair of right and left side plates 10, 11, and a top plate 12, bottom plate 13 and bar 14 interconnecting the two side plates 10, 11. A cassette holder 6 is movably supported on the frame 1. When the cassette holder 6 is positioned close to a cassette inlet 16; a cassette can be inserted into the holder.

The cassette holder 6 has a bottom portion 60 and right and left bent portions 61, 62 at opposite ends of the bottom portion. The left bent portion 62 has a first guide pin 67 projecting outward therefrom and a cassette pressing piece 63 extending inward therefrom. The right bent portion 61 is similarly provided with a second guide pin 66 and a cassette pressing piece 63 and further has integrally formed therewith outwardly extending third and fourth guide pins 68, 69. The left bent portion 62 is formed with two small windows 113, 114. A plate spring 110 is fixed to the left bent portion 62 and has a pair of projections 111, 112 projecting from the windows 113, 114, respectively. The plate spring 110 serves to fixedly position the cassette in the holder 6 when the cassette is placed thereinto, by the pressing contact of the two projections 111, 112 with one side of the cassette.

The cassette inlet 16 of the frame 1 is provided with an openable closure 15 for preventing ingress of extraneous matter.

The right and left side plates 10, 11 of the frame 1 are formed with L-shaped first guide apertures 17, 17, respectively. Guide rollers 93, 92 mounted on the first and second guide pins 67, 66 of the cassette holder 6 are slidably fitted in the guide apertures 17, 17 to guide the movement of the cassette holder 6.

The right side plate 10 is formed at the horizontal portion of the first guide aperture 17 with an inwardly bent guide piece 18 for guiding the third and fourth guide pins 68, 69 of the cassette holder 6.

The right side plate 10 further has a second guide aperture 19 extending vertically. A vertical guide plate 9 is vertically movably fitted in the guide aperture 19. The vertical guide plate 9 comprises a U-shaped guide portion 90 for receiving the third and fourth guide pins 68, 69 which are guided along the bent guide piece 18 and further guiding the pins horizontally inward of the frame 1, and a slide portion 91 H-shaped in cross section and fitting in the second guide aperture 19.

Main shafts 82, 83 extend outward from the right and left side plates 10, 11, respectivley. First and second rotatable gears 2, 20 and first and second rotatable levers 3, 30 are rotatably supported on the main shafts 82, 83, respectively.

Figure 3:
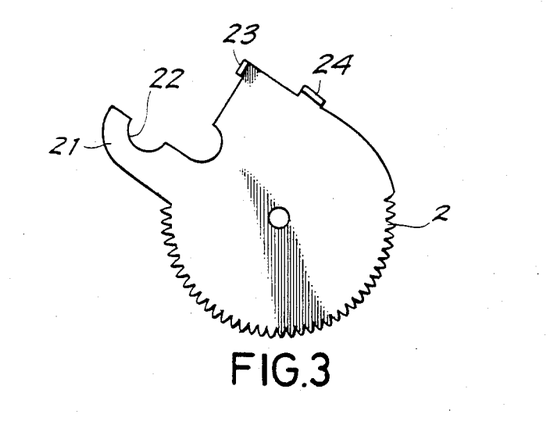
FIG. 3 is a front view of a first rotatable gear.

As shown in FIG. 3, the first rotatable gear 2 has a pressing portion 21 for pressing the guide roller 92 on the second guide pin 66 projecting from the cassette holder 6. The pressing portion 21 is formed with a cutout 22 for holding the portion 21 out of contact with the roller 92 when the cassette is completely loaded in position. The rotatable gear 2 further has a position limiting portion 23 and a coiled spring attaching portion 24 each in the form of an outwardly bent lug on its outer periphery.

Figure 4:
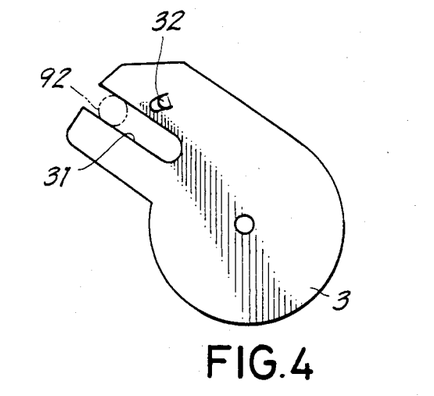
FIG. 4 is a front view of a first rotatable lever.

As shown in FIG. 4, the first rotatable lever 3 has a U-shaped retaining portion 31 with an open end, and a lug 32 for attaching a coiled spring. The guide roller 92 is slidably fitted in the retaining portion 31.

As seen in FIG. 1, the first rotatable lever 3 is superposed on the first rotatable gear 2, and a coiled spring 35 is provided therebetween, with an end portion of the lever 3 bearing on the position limiting portion 23 of the gear 2, whereby the lever 3 is made rotatable with the gear 2 by the spring 35 when the gear 2 rotates.

With reference to FIG. 2, the second rotatable gear 20 and the second rotatable lever 30 have substantially the same construction as the first gear 2 and lever 3, while the second gear 20 has an outward pin 27 loosely fitting in a guide hole 34 formed in the second lever 30. A coiled spring 36 is provided between the second gear 20 and the second lever 30 to make the two members rotatable together.

A drive shaft 7 having a hexagonal cross section rotatably extends through the side plates 10, 11. One end of the shaft 7 is supported by the left side plate 11, and the other end thereof by a bracket 8 attached to the right side plate 10.

Integrally formed with the drive shaft 7 are a gear portion 70 at its left end which portion is in mesh with the second rotatable gear 20, an inner gear portion 71 meshing with the first rotatable gear 2, a cam portion 72 and an outer gear portion 73, the portions 71 to 73 being provided at the right end of the shaft 7.

Figure 5:
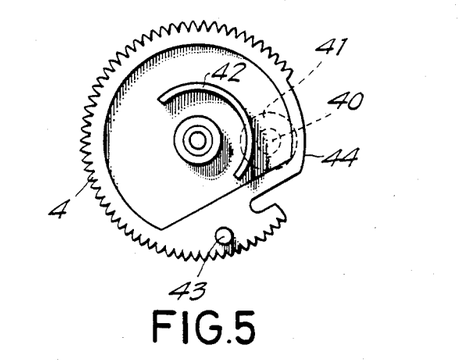
FIG. 5 is a front view of a drive gear.

A drive gear 4 is rotatably mounted on the free end of the main shaft 82. As seen in FIG. 5, the drive gear 4 is integrally formed on its inner side with a projection 40 having a roller 41 rotatably fitted thereto. The gear 4 is further integrally provided on its outer side with an arcuate protrusion 42 and a rotation stopping projection 43 and has an outer peripheral toothless portion 44. The drive gear 4 is in mesh with the outer gear portion 73 of the drive shaft 7.

A torsion spring 45 mounted on the main shaft 82 has one end engaged with a lug 80 on the bracket 8 and the other end engaged with the roller 41 on the drive gear 4, whereby the drive gear 4 is biased clockwise in FIG. 1 when the cassette holder 6 is in the cassette insertion position.

A drive motor 5 having a motor pulley 50 is mounted on the bracket 8. Rotatably mounted on the bracket 8 are a third gear 53 integral with a first pulley 52 which is coupled with the motor pulley 50 by a belt 51, and a stepped gear 54 having a large-diameter gear portion in mesh with the third gear 53 and a small-diameter gear portion in mesh with the drive gear 4. A limit switch 84 is disposed in the path of revolution of the arcuate protrusion 42. While the protrusion 42 is in contact with the limit switch 84, the switch 84 is held closed, permitting the operation of the drive motor 5.

The left side plate 11 is provided with closure opening control means (not shown) in operative relation with the second rotatable gear 20 for opening or closing the closure 15 according to the position of the cassette holder 6.

The operation of the present embodiment will be described below.

Standby State

Before the insertion of a cassette, the arcuate protrusion 42 on the drive gear 4 is away from the limit switch 84 as seen in FIG. 1, leaving the switch 84 open and holding the drive motor 5 at rest. The guide rollers 92, 93 projecting from the cassette holder 6 are positioned at the start ends of the horizontal portions of the first guide apertures 17, 17 as illustrated, and the cassette holder 6 is in the cassette insertion position most proximate to the cassette inlet 16.

Insertion of Cassette

Next, the cassette 100 is inserted through the inelt 16 and accommodated in the holder 6.

Figure 6:
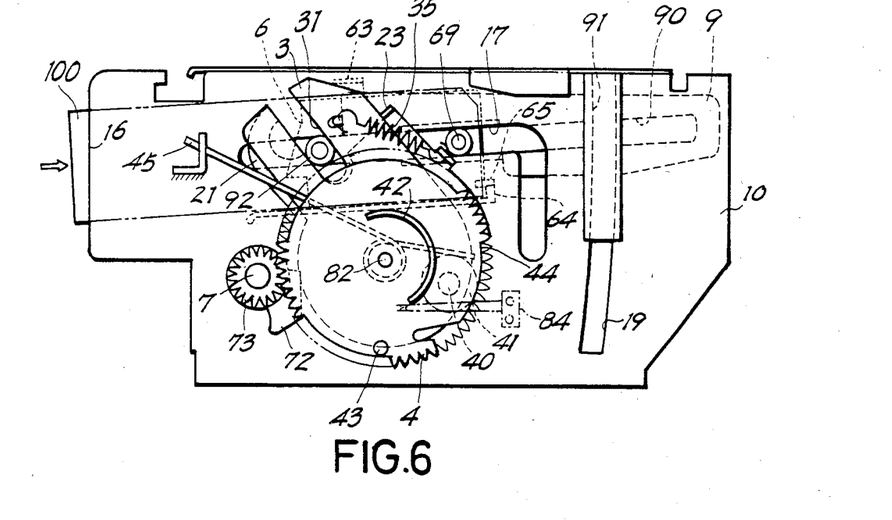
FIG. 6 is a right side elevation showing the cassette loading device when a cassette is moved horizontally.

When the cassette 100 is further pushed manually in the direction of insertion as shown in FIG. 6, the cassette 100 pushes a restraining piece 64 at the rear end of the cassette holder 6 and a cassette closure unlocking projection 65 at the rear end, moving the holder 6 15 to 20 mm in the pushing direction against the rotatable lever 3.

The movement of the cassette holder 6 rotates the first and second levers 3, 30 clockwise, further causing these levers to rotate the first and second gears 2, 20 also clockwise by pushing their position limiting portions 23. With the rotation of the gears 2, 20, the drive shaft 7 rotates counterclockwise, and the drive gear 4 meshing with the outer gear portion 73 of the drive shaft rotates clockwise.

In this case, the series of power transmission means from the drive motor 5 to the outer gear portion 73 of the drive shaft 7 via the motor pulley 50 and the drive gear 4 constitutes a first drive mechanism of a small reduction ratio which is smaller than in the conventional cassette loading device. At this time, the torsion spring 45 biases the drive gear 4 clockwise to assist in the the movement of the cassette holder 6.

Consequently, the force required for reversely driving the drive mechanism by pushing the cassette 100 in the direction of insertion can be smaller than is heretofore needed.

Horizontal Transport of Cassette Holder

With the clockwise rotation of the drive gear 4, the arcuate protrusion 42 also revolves clockwise into contact with the limit switch 84 to close the switch 84, whereby the drive motor 5 is initiated into operation. The drive force rotates the drive gear 4 clockwise, further rotates the drive shaft 7 counterclockwise and rotates the first and second gears 2, 20 clockwise. The pressing portions 21, 25 of the first and second gears 2, 20 push the guide rollers 92, 93 in the insertion direction, causing these rollers to slidingly move through the first guide apertures 17, 17 and through the retaining portions 31, 33 of the levers 3, 30 and thereby causing the holder 6 to move in the insertion direction with the cassette 100 placed therein.

Vertical Transport of Cassette Holder

Figure 7:
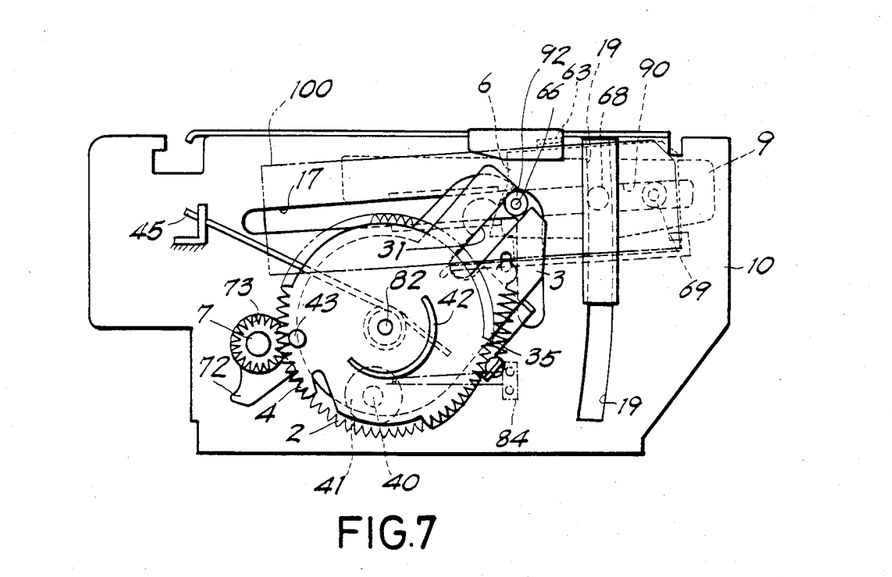
FIG. 7 is a right side elevation showing the same when the cassette in horizontal movement moves vertically.

As the rotation of the drive motor 5 further moves the cassette holder 6 horizontally, the guide rollers 93, 92 reach the bent portions of the first guide apertures 17, 17 as shown in FIG. 7. During the horizontal movement, the third and fourth guide pins 68, 69 slide on the bent guide portion 18 and then on the guide portion 90 of the vertical guide plate 9 which portion is ahead of the guide piece 18 in alignment therewith.

Figure 8:
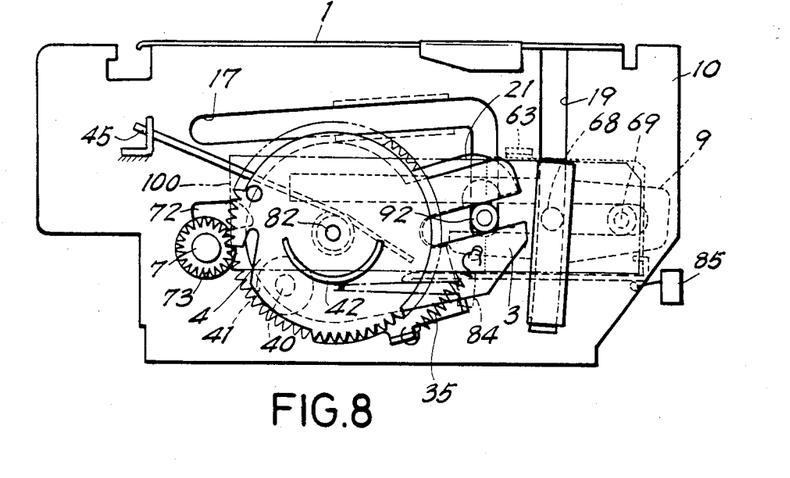
FIG. 8 is a right side elevation showing the same upon completion of the vertical movement of the cassette.

When the cassette holder 6 has completed the horizontal movement, the second, third and fourth guide pins 66, 68, 69 are accommodated in the guide portion 90 of the vertical guide plate 9 as shown in FIG. 7. The holder then moves vertically. During the vertical movement, the guide rollers 93, 92 slide along the vertical portions of the first guide apertures 17, 17 and, at the same time, the guide plate 9 also moves down with the holder 6 under the downward pressure of the guide pins 66, 68, 69. The guide rollers 93, 92 are guided to a vertical movement completion position as shown in FIG. 8.

Immediately before the cassette holder 6 reaches the position where the cassette is completely loaded, the bottom of the cassette 100 pushes a switch 85 disposed at a lower portion of the frame 1 to actuate the switch. The switch 85 is electrically connected to a microcomputer incorporated into the VTR. A predetermined period of time (about 0.6 second) after the actuation of the switch, the drive motor 5 is de-energized.

Figure 9:
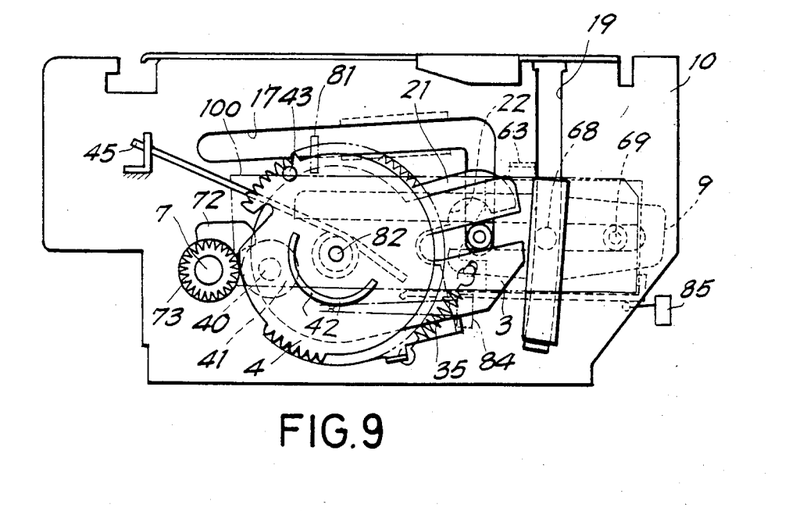
FIG. 9 is a right side elevation showing the same when the cassette is completely loaded in position upon completion of the vertical movement.

During the period after the actuation of the switch 85 until the motor 5 comes to a halt, the drive gear 4 continues rotation. In this step, the drive gear 4 first comes out of meshing engagement with the outer gear portion 73 of the drive shaft 7. A further rotation of the drive gear 4 opposes the toothless portion 44 of the gear 4 to the outer gear portion 73 of the drive shaft 7 as shown in FIG. 9, temporarily holding the gear 4 out of engagement with the shaft 7. Consequently, the shaft 7 stops rotation, and the two levers 3, 30 and the two gears 2, 20 also come to a stop.

Depression of Cassette Holder

Figure 10:
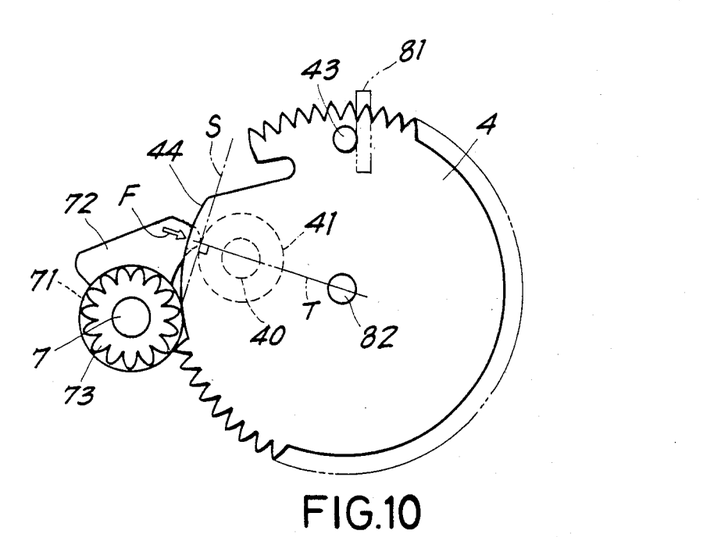
FIG. 10 is a view showing the relation in position between the drive gear and a cam portion of a drive shaft when the cassette is completely loaded in position.

The drive gear 4 further rotates clockwise, consequently bringing the roller 41 on the inner side of the gear 4 into engagement with the cam portion 72 of the drive shaft as seen in FIGS. 9 and 10. With the rotation of the drive gear 4, therefore, the drive shaft 7 starts to rotate counterclockwise again. This rotation continues until the rotation stopping projection 43 comes into contact with a stop portion 81 provided on the bracket 8 to halt the gear 4. With the rotation, the first and second rotatable gears 2, 20 supporting the cassette holder 6 also rotate clockwise. When the guide rollers 93, 92 on the cassette holder 6 come into contact with the lower ends of the apertured portions 17, 17 with a slight rotation of the gears 2, 20, the pressing portions 21, 25 and cutouts 22, 26 of the gears 2, 20 are slightly above the guide rollers 92, 92, still permitting the gears 2, 20 only to advance further.

As the gears 2, 20 advance, the springs 35, 36 are tensioned to bias the levers 3, 30 into clockwise rotation, causing the retaining portions 31, 33 of the levers to press the rollers 92, 93 down, respectively, to eliminate the backlash of the cassette holder 6.

With reference to FIGS. 9 and 10, the point of contact between the cam portion 72 and the roller 41 on the drive gear 4 at this time is positioned always inside the pitch circle of the gear 4, so that the speed of rotation of the drive shaft 7 by the engagement of the roller 41 with the cam portion 72 is smaller than the speed of rotation thereof by the meshing engagement of the gear 4 with the outer gear portion 73. Thus, the series of power transmission means from the drive motor 5 to the cam portion 72 of the drive shaft 7 via the motor pulley 50 and the roller 41 constitutes a second drive mechanism of a great reduction ratio.

Accordingly, even if the coiled springs 35, 36 are set to a great spring constant or the cam assembly comprising the roller 41 and the cam portion 72 is set to a great load, the drive motor 5 can be of a relatively small power to drive the cassette holder 6 into a reliably held state.

When the cassette holder 6 is pressed down against the frame 1, the cassette 100 is also pressed down against and held to a reel support (not shown) by the pressing pieces 63, 63 of the holder 6.

The cam face of the cam portion 72 is so shaped that when the cassette is completely loaded in position, a line S tangent to the roller 41 and to the cam portion 72 is perpendicular to a straight line T through the center of the drive gear 4 and the center of the roller 41 as shown in FIG. 10. Accordingly the reaction F on the roller 41 acts toward the center of the drive gear 4, and the drive gear 4 and the drive shaft 7 are dynamically in balance. As a result, the drive gear 4, although subjected to a side pressure to press the main shaft 82, is free of a clockwise or counterclockwise torque and remains at rest even after the drive motor 5 stops.

Ejection of Cassette

The cassette is ejected in the following manner.

When an ejection action is taken with the cassette in its completely loaded position, the drive motor 5 is energized and rotated in a direction opposite to the loading direction. The cassette holder 6 moves vertically and then horizontally. Immediately before the completion of the horizontal movement, the limit switch 84 is released from the arcuate protrusion 42 and opened.

Consequently, the microcomputer de-energizes the drive motor 5 a predetermined period of time (about 0.3 second) after the opening of the switch 85. During the 0.3 -second period, the cassette holder 6 returns to the initial insertion standby position to completely eject the cassette 100.

As shown in FIGS. 1 and 6, the torsion spring 45 is in engagement at its one end with the roller 41 only while the cassette is manually moved and thereafter comes out of contact with the roller 41 as seen in FIG. 7. Thus, the spring 45 serves to reduce the load on the power transmission mechanism during the manual movement of the cassette holder 6 to facilitate the insertion of the cassette 100.

With the cassette loading device of the present invention, the power transmission mechanism can be set to a sufficiently small reduction ratio for transporting the cassette holder but to a great reduction ratio for locking the cassette holder. This enables the roller 41 to press the cam portion 72 as shown in FIGS. 9 and 10 with an increased pressure, making it possible to hold the casette holder 6 with a sufficiently increased force and also to reduce the force required for pushing in the cassette holder before the drive motor is initiated into operation upon the insertion of the cassette.

Accordingly, the cassette loading device of the present invention is very advantageous in being composed of a reduced number of parts and having improved reliability without necessitating the complex mechanism conventionally needed.

What is claimed is:

1. A cassette loading device comprising a cassette holder for holding a cassette inserted through a cassette inlet, transport means for moving the cassette from an insertion position to a completely loaded position by driving the cassette holder, and a reduction drive assembly for coupling the transport means to a drive source, the reduction drive assembly comprising a first drive mechanism having a small reduction ratio and disengageably in engagement with the transport means when the cassette holder is located between the insertion position and the completely loaded position, and a second drive mechanism having a great reduction ratio and disengageably engageable with the transport means when the cassette holder is brought to the completely loaded position or immediately therebefore.

2. A device as defined in claim 1 wherein the transport means comprises a rotatable gear coupled to and rotatable with a drive shaft, and a rotatable lever rotatably supported by a shaft supporting the rotatable gear and coupled to the rotatable gear by a spring, the rotatable lever being in engagement with cassette holder for transporting the cassette holder between the insertion position and the completely loaded position by the rotation of the lever.

3. A device as defined in claim 1 wherein the first drive mechanism comprises a drive shaft coupled to the transport means, and a drive gear coupled to a motor as the drive source and in engagement with the drive shaft while the cassette holder is located between the insertion position and the completely loaded position, the drive gear being disengageable from the drive shaft when the cassette holder is brought to the completely loaded position or immediately therebefore.

4. A device as defined in claim 3 wherein the drive gear of the first drive mechanism is engageable with a gear on the drive shaft and has a toothless portion on its periphery, the toothless portion being positionable in opposed relation to the gear on the drive shaft when the cassette holder is brought to the completely loaded position or immediately therebefore to disengage the drive gear from the gear on the drive shaft.

5. A device as defined in claim 1 wherein the second drive mechanism comprises a drive shaft coupled to the transport means, and drive means coupled to a motor as the drive source and engageable with the drive shaft when the cassette holder is brought to the completely loaded position or immediately therebefore.

6. A device as defined in claim 5 wherein the drive shaft has a cam portion at its one end, and the drive means comprises a roller engageable with the cam portion in pressing contact therewith when the cassette holder is brought to the completely loaded position or immediately therebefore.

7. A device as defined in claim 1 wherein the first drive mechanism comprises a drive shaft coupled to the transport means and having a gear at its one end, and a drive gear coupled to a motor as the drive source and formed on its periphery with a toothed surface engageable with the gear on the drive shaft and a toothless portion positionable in opposed relation to the gear on the drive shaft when the cassette holder is brought to the completely loaded position or immediately therebefore, and the second drive mechanism comprises a cam portion provided at an end portion of the drive shaft, and a roller provided on one side surface of the drive gear and engageable with the cam portion when the cassette holder is brought to the completely loaded position or immediately therebefore, the point of engagement of the roller with the cam portion being positioned inside the pitch circle of the drive gear at all times.

* * * * *